United States Patent
Lengyel et al.

(10) Patent No.: US 9,631,744 B2
(45) Date of Patent: Apr. 25, 2017

(54) AERIAL REFUELING HOSE

(71) Applicant: Mide Technology Corporation, Medford, MA (US)

(72) Inventors: Attila Jozsef Lengyel, Medford, MA (US); Marthinus Cornelius van Schoor, Arlington, MA (US); Jeffrey Richard Court, Stow, MA (US)

(73) Assignee: Mide Technology Corporation, Medford, MA (US)

( * ) Notice: Subject to any disclaimer, the term of this patent is extended or adjusted under 35 U.S.C. 154(b) by 291 days.

(21) Appl. No.: 14/507,166

(22) Filed: Oct. 6, 2014

(65) Prior Publication Data

US 2015/0096642 A1  Apr. 9, 2015

Related U.S. Application Data

(60) Provisional application No. 61/888,707, filed on Oct. 9, 2013.

(51) Int. Cl.
*F16L 11/08* (2006.01)
*F16L 55/033* (2006.01)
*D04C 1/02* (2006.01)

(52) U.S. Cl.
CPC .............. *F16L 11/085* (2013.01); *D04C 1/02* (2013.01); *F16L 11/088* (2013.01); *F16L 55/0336* (2013.01); *Y10T 29/49826* (2015.01)

(58) Field of Classification Search
CPC ............................ F16L 11/085; F16L 11/088
USPC .................. 138/126, 127, 141, 137
See application file for complete search history.

(56) References Cited

U.S. PATENT DOCUMENTS

| 1,052,106 | A | * | 2/1913 | Voorhees | F16L 11/088 |
| | | | | | 138/127 |
| 1,726,957 | A | * | 9/1929 | Hughes | B29D 23/001 |
| | | | | | 138/127 |
| 2,730,133 | A | * | 1/1956 | Holland-Bowyer | B29D 23/001 |
| | | | | | 138/127 |
| 4,241,763 | A | | 12/1980 | Antal et al. | |
| 4,706,712 | A | * | 11/1987 | Oglesby | B29C 53/582 |
| | | | | | 138/125 |
| 5,698,278 | A | * | 12/1997 | Emond | F16L 11/085 |
| | | | | | 138/127 |
| 6,550,341 | B2 | | 4/2003 | van Schoor et al. | |
| 6,866,228 | B2 | | 3/2005 | Bartov | |
| 7,007,894 | B1 | | 3/2006 | Takacs et al. | |
| 7,137,597 | B2 | | 11/2006 | Schuster et al. | |
| 7,347,226 | B2 | * | 3/2008 | Colbachini | B32B 25/10 |
| | | | | | 138/125 |

(Continued)

OTHER PUBLICATIONS

Innovative Energy Absorbing Aerial Refueling (AR) Hose, Navair—Ms. Donna Moore, Navy SBIR 2011.2—Topic N112-112, http://www.navysbir.com/n11_2/N112-112.htm; three (3) pages.

(Continued)

*Primary Examiner* — Patrick F Brinson
(74) *Attorney, Agent, or Firm* — Iandiorio Teska & Coleman, LLP

(57) ABSTRACT

An in-flight refueling hose and method. The hose includes an inner braid including pseudoelastic shape memory alloy (e.g., nitinol) wires. These wires undergo a stress induced phase change absorbing energy to dampen oscillations of the hose in use.

12 Claims, 5 Drawing Sheets

(56) References Cited

U.S. PATENT DOCUMENTS

| | | |
|---|---|---|
| 7,516,762 B2 * | 4/2009 | Colbachini ............ F16L 11/112 |
| | | 138/121 |
| 7,516,920 B2 | 4/2009 | Schroeder |
| 7,665,479 B2 | 2/2010 | Cutler et al. |
| 8,398,028 B1 | 3/2013 | Speer et al. |
| 2006/0278762 A1 | 12/2006 | Schroeder |
| 2009/0236004 A1 * | 9/2009 | Jani ...................... F16L 11/083 |
| | | 138/127 |
| 2009/0302160 A1 | 12/2009 | Adarve Lozano |
| 2013/0020441 A1 | 1/2013 | Peake |

OTHER PUBLICATIONS

Military Specification, Hose Assembly, Rubber, Aerial Refueling, MIL-H-4495D, Source: http://www.assistdocs.com; May 10, 1985, seventeen (17) pages.

* cited by examiner

US 9,631,744 B2

AERIAL REFUELING HOSE

RELATED APPLICATIONS

This application claims benefit of and priority to U.S. Provisional Application Ser. No. 61/888,707 filed Oct. 9, 2013 under 35 U.S.C. §§119, 120, 363, 365, and 37 C.F.R. §1.55 and §1.78, the contents of which are incorporated herein by this reference.

GOVERNMENT RIGHTS

This invention was made with U.S. Government support under Contract No. N68335-13-C-0079 funded by Navy SBIR Phase II. The Government may have certain rights in the invention.

FIELD OF THE INVENTION

The invention relates to in-flight refueling hoses and other applications involving pressurized hoses.

BACKGROUND OF THE INVENTION

There have been several attempts to address the problem of in-flight refueling hoses oscillating in flight during refueling operations. See, for example, U.S. Pat. Nos. 7,007,894; 7,137,597; and 6,866,228; and Published U.S. Application No. 2009/0302160 all incorporated herein by this reference.

To date, however, potential solutions have either not been commercialized, do not result in a hose meeting government specification (e.g., MIL-H-4495D), and/or do not adequately solve the oscillation problem.

The oscillations can result in hose breakage, damage to the refueling aircraft or the aircraft being refueled, and/or potential harm to personnel.

SUMMARY OF THE INVENTION

Current in-flight refueling hoses typically include a seamless compounded inner tube, a breaker fabric, a spiral of high tensile steel wire, a synthetic rubber layer, a braid of high tensile steel wire (e.g., 0.012" in diameter carbon steel), and a compounded cover. The result is a high strength, crush resistant, flexible, high pressure hose. By incorporating pseudoelastic shape memory alloy wires into the braid in place of the high tensile steel wires, the oscillation problem is solved and yet the hose still meets the above noted specifications. Manufacturing of the hose is similar to manufacturing a hose with a steel wire braid. The pseudoelastic shape memory alloy material (e.g., nitinol) undergoes a phase change in response to induced stresses and absorbs energy to damp oscillations large enough to induce strain. In response to stress, the alloy wires undergo strain and deform undergoing a phase change absorbing energy and then return to the original strain level. The result is a passive oscillation reducing system for in-flight refueling hoses and other similar hoses subject to oscillations.

Featured is an in-flight refueling hose comprising a rubber inner tube, a compounded cover, and a spiral wire between the inner tube and the compounded cover. A braid includes pseudoelastic shape memory alloy (e.g., nitinol) wires undergoing a stress induced phase change absorbing energy to dampen oscillations of the hose in use.

In one preferred design, the braid is wholly made of said pseudoelastic shape memory alloy wires. The braid may also include, for example, steel wires. Also, the hose has a working temperature range and the pseudoelastic shape memory alloy may be configured to have a phase transition temperature below (or proximate) the hose working temperature range. The pseudoelastic shape memory alloy wires in the braid may be pre-strained. And, the braid may include wires at a braid angle which renders the hose hoop stress equivalent to or approximately equivalent to the hose axial stress.

The pseudoelastic shape memory alloy wires in the braid may be in bundles of individual wires braided in the hose. In one example, the pseudoelastic shape memory alloy wires have a diameter of between 0.012 inches and 0.017 inches.

The hose may further include a breaker fabric. The braid may be between the helical wire and the inside or the outside of the hose.

Also featured is a method of fabricating an in-flight refueling hose. One method comprises embedding in the hose a braid including pseudoelastic shape memory alloy wires configured to induce a phase change in the alloy wires in response to stress to dampen oscillations of the hose in use.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features, and advantages will occur to those skilled in the art from the following description of a preferred embodiment and the accompanying drawings, in which.

DETAILED DESCRIPTION OF THE INVENTION

Figure 1:
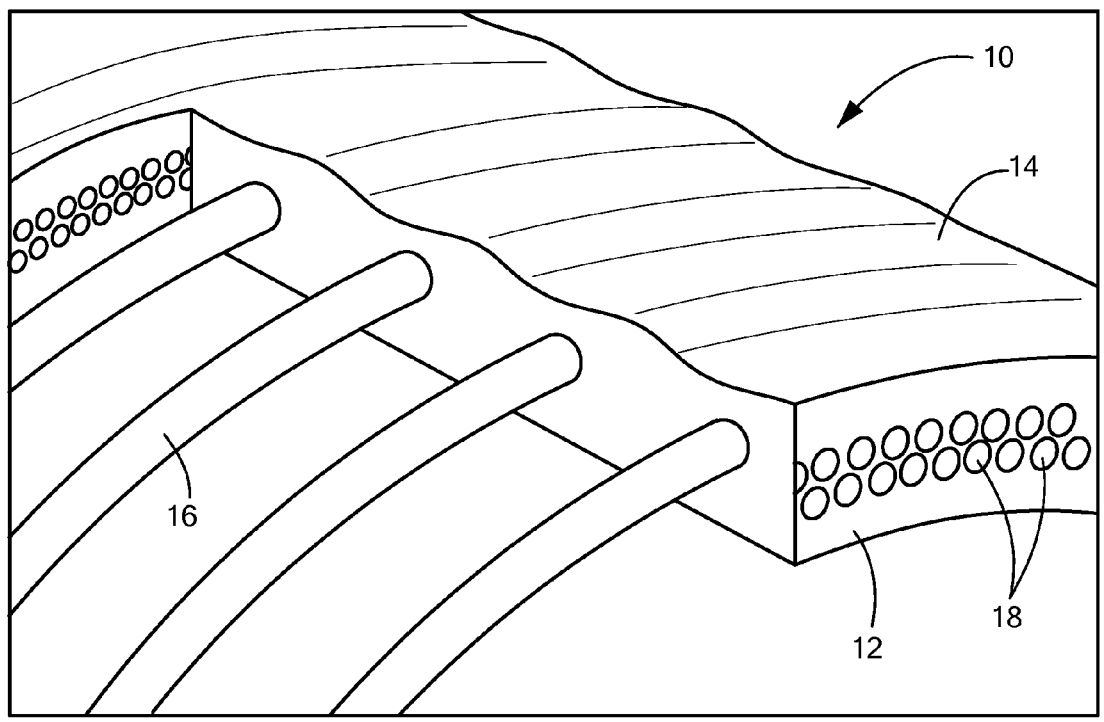
FIG. 1 is a schematic partially cutaway view showing the primary components associated with an in-flight refueling hose.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of an in-flight refueling or similar hose 10 with rubber inner tube 12 (preferably seamless) and compounded cover 14. Crush coil or helical wire 16 is typically steel. Braid wires 18 are formed using a braid machine 20, FIG. 2, to form braid 22, FIG. 3 in the hose. In some examples, the braid is between the helical wire and the interior of the hose; in other examples, the braid is between the helical wire and the outside of the hose. More than one braid may be included. Also, other layers are possible including a breaker fabric layer and the like.

Figure 4:
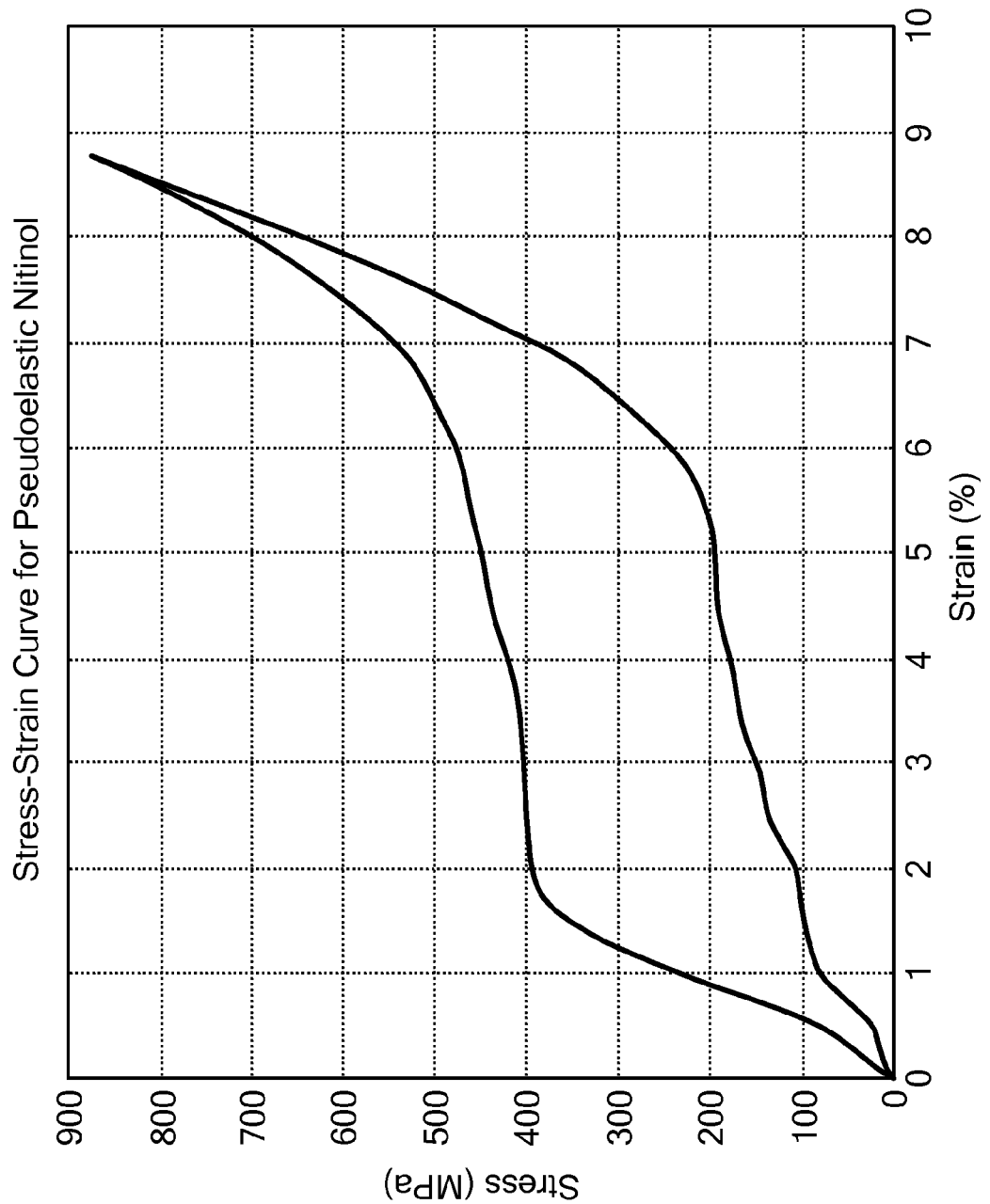
FIG. 4 is a stress-strain curve for pseudoelastic nitinol wires used in the braid of FIGS. 1-3.
Figure 5:
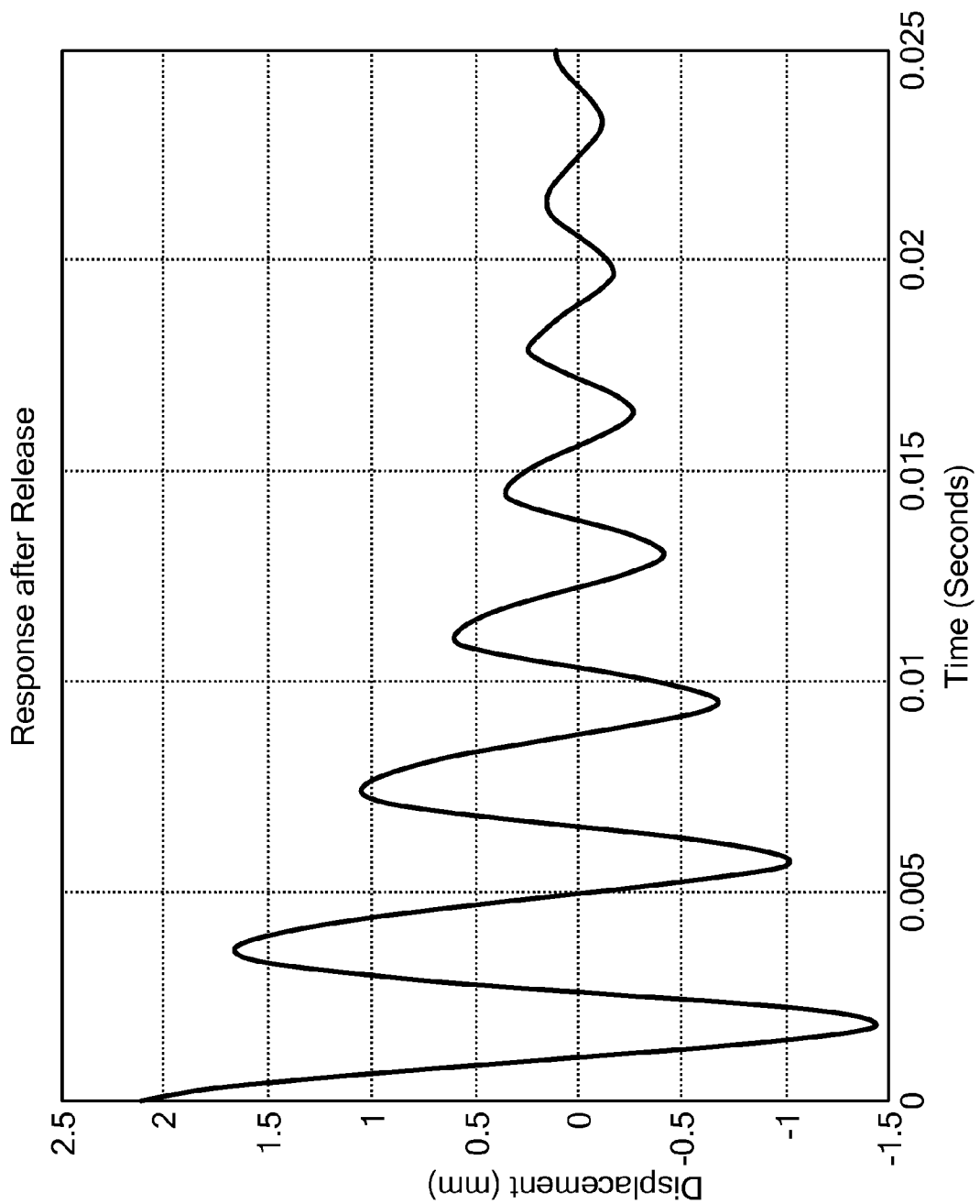
FIG. 5 is a graph showing displacement verses time for a refueling hose where the braid includes pseudoelastic shape memory alloy wires.

In the invention, all or some of the braid wires 18, FIG. 1 includes pseudoelastic shape memory alloy wires (e.g., nitinol or similar type material) which undergo a stress induced phase change absorbing energy as shown in FIG. 4 to dampen hose oscillations as shown in FIG. 5. See also U.S. Pat. No. 6,550,341 incorporated herein by this reference. That patent discloses the properties of pseudoelastic nitinol and other similar materials. 10% to 50% of the braid wires may be nitinol wires. The remainder may be steel. In some embodiments, 100% of the braid wires may be made of nitinol.

In one example, the nitinol wires were about 0.015" in diameter and the braid had eight ends (e.g., each braid member 23 includes eight adjacent wires). Typically, compared to steel wires, additional and slightly larger diameter nitinol wires may be required to meet the strength specification of MIL-H-4495D. But, the other requirements of this specification were met with the additional larger diameter nitinol wires between about 0.01 inches and about 0.02 inches.

Figure 2:
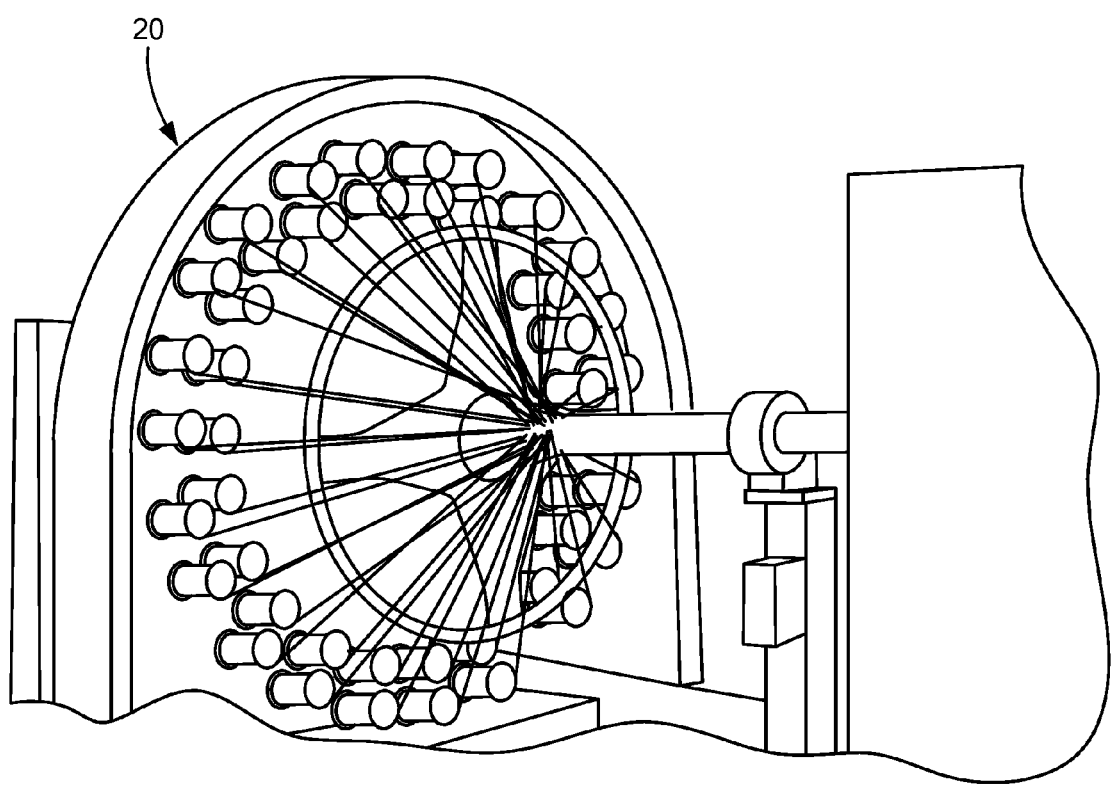
FIG. 2 is a schematic view showing a braiding machine used to form the braid shown in FIG. 1 including pseudoelastic shape memory alloy wires.
Figure 3:
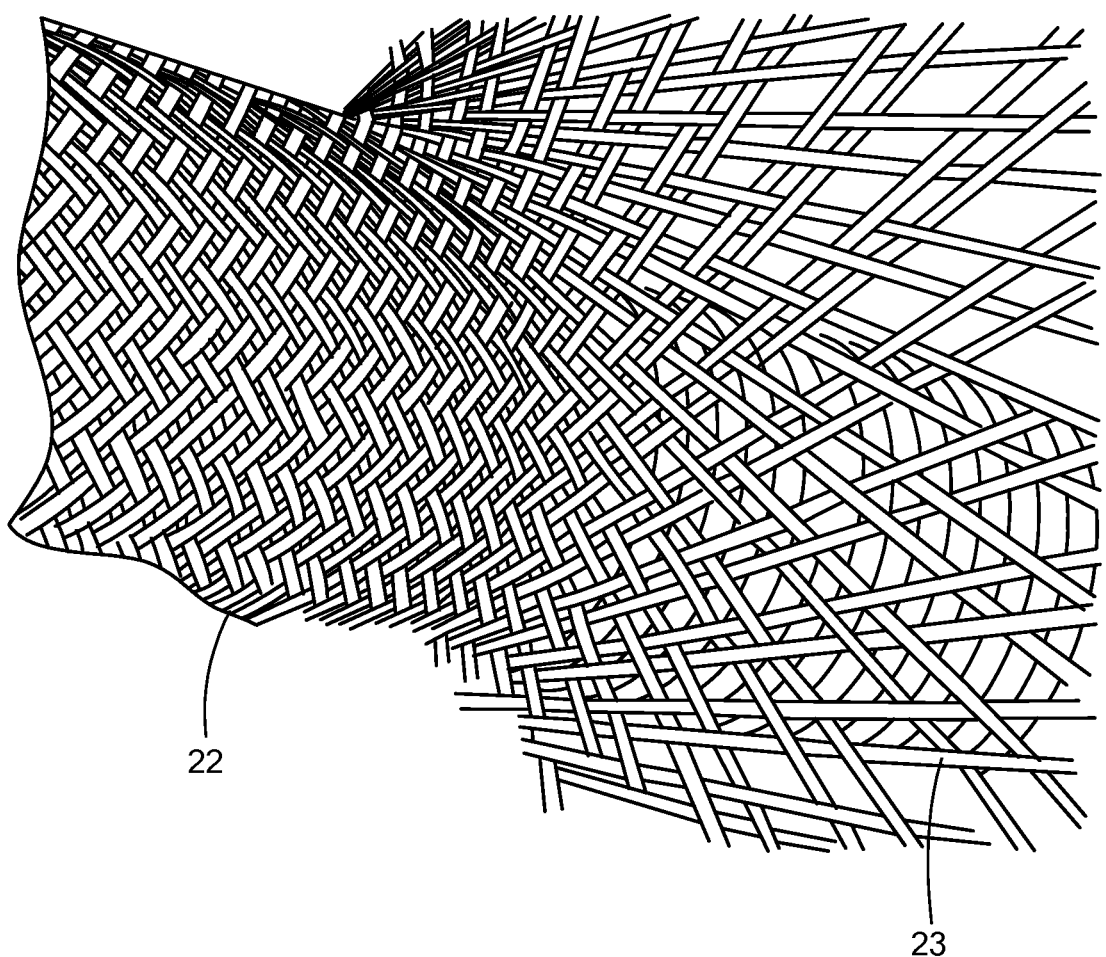
FIG. 3 is a schematic view showing the braid of pseudoelastic shape memory alloy wires being formed in the hose of FIG. 1.

The nitinol wires in the braid can also be pre-stressed on the braiding machine 20, FIG. 2 to adjust the origin of the curve of FIG. 4. A load on the braiding machine spools as they pay out the nitinol wires in the braid can be used to preload the wires. In one example, the pre-load was approximately 20 lbs. It is also an aspect of examples of this to choose a nitinol material configured to have a phase transition temperature below the working temperature range of the hose. In one example, a typical in-flight refueling hose is used at high elevation and has fuel running through it. The working temperature range of a typical air refueling hose can vary from −65° F. to +50° F. depending on the altitude and local weather conditions. Nitinol maintains psuedoelasticity when its transition temperature is near or below the ambient temperature. Suitable transition temperatures of Nitinol wire for aerial refueling could range from 0° F. to −94° F. Transition temperature is not a specific temperature, but a range through which the material would undergo a phase change is the temperature was raised and lowered, thus wires with a range of temperatures can be used.

The braid angle can also play a role in designing a hose which meets the requirements. At a braid angle of between 50° to 55° (e.g., 52.7° or 54.7°), it was determined that the hoop stress was equivalent or approximately equivalent to the hose axial stress meaning the hose does not fail due to hoop stress before it fails due to axial stress and vise-versa.

In use, when the nitinol wires of the braid experience stress as shown in FIG. 4, they strain and experience a phase change absorbing energy in a thermodynamic reaction giving off heat energy. When the stress is reversed, the strain returns to its initial value as shown in FIG. 4. The resulting use of this super elastic material dampens hose oscillations due to wind, due to being struck by the probe of the aircraft being refueled, due to being reeled in by the hose reel, or the like. Oscillations large enough to induce the strain resulting in a phase change of the nitinol wires will be dampened.

The super elastic nitinol wires chosen do not adversely affect the current strength and performance of the hose. Nitinol is very corrosion resistant and will not have any adverse reactions with the existing materials in the hose, reel, drogue, or manufacturing equipment and its strength is less than that of steel which can be accommodated by adding more and/or larger diameter wires than needed when using steel without significantly increasing the weight of the hose since the density of nitinol is less than steel. Incorporating the super elastic wire into the braid of the hose is a viable approach both from a performance point of view and a manufacturability point of view.

In one example, spools of super elastic nitinol wire are mounted on braiding machine 20, FIG. 2 and the wires are pulled together from each of the carriers together with a preload as discussed above. The tension can be set at the bobbin. The tension can be varied as needed and different tensions levels can be used to create different responses. The braid angle can be varied, for example, the braid angle can be changed near the drogue section. Multiple braids are also possible which provides an additional method to match the strength of a steel braid with multiple nitinol braids and more super elastic nitinol material. A braid may include nitinol and steel wires. It has been demonstrated that the energy absorbing hose can be coupled identically to a legacy hose made with a steel braid.

The result is a new hose usable with existing drum reels having typical diameters ranging from 14" to 20", for example. The hose weight is near the present hose systems. And, the hose with the super elastic nitinol wire braid meets the crush, vacuum, bend, and other requirements of MIL-H-4495D.

A braid angle may not necessarily properly account for all the loads acting on the hose during aerial refueling. Elongation and diameter change due to fluid pressure inside the hose is calculated, but this does not account for the load applied by aerodynamic drag of the drogue and hose, or the external loads generated during an engagement. This creates an opportunity to use the braid angle to change hose behavior under certain situations. In order to damp oscillations, axial extension of the hose is important to understand. It is possible to adjust the braid angle of the hose to control hose deformation in a way that can damp oscillations. Increasing the amount of hoop stress may place the hose closer to the nitinol nonlinear region thus improving performance with respect to absorbing energy from engagement. Similarly changing the braid angle along the length of the hose may help to dissipate waves sooner as the hose stiffness will vary and result in wave dispersion since the hose becomes a non-uniform wave guide with non-constant group and phase velocities.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An in-flight refueling hose comprising:
   a rubber inner tube;
   a compounded cover;
   a helical wire between the inner tube and the compounded cover; and
   a braid including pseudoelastic shape memory alloy wires undergoing a stress induced phase change absorbing energy that dampens oscillations of the hose in use.

2. The hose of claim 1 in which the braid is wholly made of said pseudoelastic shape memory alloy wires.

3. The hose of claim 1 in which the braid includes both pseudoelastic shape memory alloy wires and steel wires.

4. The hose of claim 1 in which the hose has a working temperature range and the pseudoelastic shape memory alloy is configured to have a phase transition temperature below or proximate the hose working temperature range.

5. The hose of claim 1 in which the pseudoelastic shape memory alloy wires in the braid are pre-strained.

6. The hose of claim 1 in which the braid includes wires at a braid angle which renders the hose hoop stress equivalent to or approximately equivalent to the hose axial stress.

7. The hose of claim 1 in which the pseudoelastic shape memory alloy wires in the braid are in bundles of individual wires, said bundles braided in the hose.

8. The hose of claim 1 in which the pseudoelastic shape memory alloy wires have a diameter of between 0.012" and 0.017".

9. The hose of claim 1 in which the hose further includes a breaker fabric.

10. The hose of claim 1 in which the braid is between the helical wire and the inside of the hose.

11. The hose of claim 1 in which the braid is between the helical wire and the outside of the hose.

12. The hose of claim 1 in which pseudoelastic shape memory alloy wires are made of nitinol.

* * * * *